(12) United States Patent
Liu et al.

(10) Patent No.: US 10,168,561 B2
(45) Date of Patent: Jan. 1, 2019

(54) DEVICE AND METHOD FOR STRIPPING FLEXIBLE SUBSTRATE

(71) Applicant: Boe Technology Group Co., Ltd., Beijing (CN)

(72) Inventors: Lu Liu, Beijing (CN); Mingche Hsieh, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 95 days.

(21) Appl. No.: 15/515,116

(22) PCT Filed: Apr. 1, 2016

(86) PCT No.: PCT/CN2016/078268
§ 371 (c)(1),
(2) Date: Mar. 28, 2017

(87) PCT Pub. No.: WO2016/206434
PCT Pub. Date: Dec. 29, 2016

(65) Prior Publication Data
US 2017/0212371 A1    Jul. 27, 2017

(30) Foreign Application Priority Data
Jun. 26, 2015   (CN) .......................... 2015 1 0364630

(51) Int. Cl.
*B32B 43/00* (2006.01)
*G02F 1/1333* (2006.01)
(Continued)

(52) U.S. Cl.
CPC ............ *G02F 1/1333* (2013.01); *B23K 26/36* (2013.01); *B32B 38/10* (2013.01); *B32B 43/006* (2013.01);
(Continued)

(58) Field of Classification Search
CPC ......... B29C 43/32; B29C 43/52; B29C 43/56; B29C 2043/3605; B29C 2043/561
(Continued)

(56) References Cited

U.S. PATENT DOCUMENTS

2013/0020731 A1   1/2013  Kim et al.
2015/0375494 A1*  12/2015 Xie ....................... B32B 43/006
                                                              156/379.6
2016/0039182 A1   2/2016  Wang

FOREIGN PATENT DOCUMENTS

CN      102890351 A     1/2013
CN      103700662 A     4/2014
(Continued)

OTHER PUBLICATIONS

International Search Report and Written Opinion in PCT/CN2016/078268 dated Jul. 11, 2016, with English translation. 18 pages.
(Continued)

*Primary Examiner* — Joseph S Del Sole
*Assistant Examiner* — Thu Khanh T Nguyen
(74) *Attorney, Agent, or Firm* — Womble Bond Dickinson (US) LLP

(57) ABSTRACT

It is disclosed a device and method for stripping a flexible substrate. The stripping device comprises: a platform for carrying a base plate on which a flexible substrate is formed; a pressing plate for being pressed onto the flexible substrate; and a laser generator for emitting laser for heating the base plate, so that the flexible substrate is decomposed on a side contacting the base plate and thus stripped; wherein the pressing plate is provided with a negative pressure passage, the pressing plate is provided with a suction mouth which is arranged in a side of the pressing plate facing the platform and which communicates with the negative pressure passage, and the negative pressure passage extracts through the
(Continued)

suction mouth a gas which is generated during decomposition of the flexible substrate on a side contacting the base plate.

20 Claims, 4 Drawing Sheets

(51) Int. Cl.
  *B32B 38/10*  (2006.01)
  *G02F 1/13*  (2006.01)
  *B23K 26/36*  (2014.01)
  *B32B 17/06*  (2006.01)

(52) U.S. Cl.
  CPC ............... *G02F 1/13* (2013.01); *B32B 17/06* (2013.01); *B32B 2310/0843* (2013.01); *B32B 2457/202* (2013.01); *G02F 1/133305* (2013.01)

(58) Field of Classification Search
  USPC ........................................................ 425/388
  See application file for complete search history.

(56) References Cited

FOREIGN PATENT DOCUMENTS

| | | |
|---|---|---|
| CN | 101802441 A | 5/2014 |
| CN | 103802441 A | 5/2014 |
| CN | 104898313 A | 9/2015 |
| JP | 2014135348 A | 7/2014 |
| KR | 101073727 B1 | 10/2010 |
| KR | 101073727 B1 | 10/2011 |

OTHER PUBLICATIONS

Office Action in Chinese Application No. 201510364630.1 dated Jun. 12, 2017, with English translation.

\* cited by examiner

DEVICE AND METHOD FOR STRIPPING FLEXIBLE SUBSTRATE

RELATED APPLICATIONS

The present application is the U.S. national phase entry of PCT/CN2016/078268, with an international filing date of Apr. 1, 2016, which claims the benefit of Chinese Patent Application No. 201510364630.1, filed on Jun. 26, 2015, the entire disclosures of which are incorporated herein by reference.

TECHNICAL FIELD

The present disclosure relates to the field of liquid crystal display, and particularly to a device and method for stripping a flexible substrate.

BACKGROUND

A liquid crystal display (LCD) technique has been developing rapidly in the past ten years, in terms of both the screen size and the display quality. With the development of the flexible display technique, a flexible display product with a display mode closer to the conventional display mode will become popular. Due to the feature of flexibility, the flexible display can offer special user experience in various aspects.

During fabrication of the flexible device, it is critical to separate the flexible substrate from a carrier substrate. In the prior art, a mechanical stripping or laser stripping technique is used. Since the laser stripping technique brings about less damage to the flexible substrate, it has been widely applied. In the laser stripping technique, the flexible substrate is arranged on a glass substrate (i.e., the glass substrate is adopted as the carrier substrate), and a display device is formed on the flexible substrate, and then laser is used to irradiate a contact interface between the glass substrate and the flexible substrate, for separating the flexible substrate from the glass substrate.

However, when the laser irradiates the contact interface between the glass substrate and the flexible substrate, the energy is absorbed by the flexible substrate, so that the flexible substrate is ablated to produce gas. Therefore, the flexible substrate locally expands, and corrugation occurs in the flexible substrate upon cooling, which leads to defective products.

SUMMARY

In an embodiment of the present disclosure, a device for stripping a flexible substrate, comprises: a platform configured to carry a base plate on which a flexible substrate to be stripped is formed; a pressing plate configured to be pressed onto the flexible substrate to be stripped; and a laser generator configured to emit laser for heating the base plate, so that the flexible substrate to be stripped is decomposed on a side contacting the base plate and thus stripped; wherein the pressing plate is provided with a negative pressure passage, the pressing plate is provided with a suction mouth which is arranged in a side of the pressing plate facing the platform and which communicates with the negative pressure passage, and the negative pressure passage extracts through the suction mouth a gas which is generated during decomposition of the flexible substrate to be stripped on a side contacting the base plate.

In the present embodiment, the pressing plate is provided with the negative pressure passage and the suction mouth, which can extract the gas generated when the flexible substrate to be stripped is heated and decomposed. This avoids the flexible substrate to be stripped from locally expanding, and corrugation will not occur in the flexible substrate to be stripped upon cooling, thus decreasing defective products.

For example, the flexible substrate to be stripped comprises an exhaust passage.

For example, the exhaust passage of the flexible substrate to be stripped corresponds to the suction mouth of the pressing plate in position. Since the exhaust passage of the flexible substrate to be stripped corresponds to the suction mouth of the pressing plate in position, the gas can be extracted more effectively, and corrugation in the stripped flexible substrate can be avoided more effectively.

For example, the pressing plate is arranged above the platform, the laser generator is arranged below the platform, and the laser emitted by the laser generator passes through the platform to irradiate the base plate.

For example, the stripping device further comprises a negative pressure generator configured to provide negative pressure for the negative pressure passage of the pressing plate.

For example, the stripping device further comprises a supporting part which is provided with a vertical guide rail and a horizontal guide rail;

the pressing plate is arranged on the supporting part, and is moved vertically along the vertical guide rail or horizontally along the horizontal guide rail.

For example, the stripping device further comprises a connecting arm, which is connected with the pressing plate and drives the pressing plate to move vertically or horizontally.

For example, the connecting arm is a robotic manipulator.

For example, the laser emitted by the laser generator has a wavelength less than 355 nm.

For example, the laser generator is a XeCl laser generator with a laser wavelength of 308 nm, or a yttrium aluminum garnet laser with a laser wavelength of 355 nm.

For example, the suction mouth has a shape of groove.

For example, the suction mouth comprises a plurality of holes communicating with the negative pressure passage.

An embodiment of the present disclosure further provides a method for stripping a flexible substrate, with the stripping device provided in the above embodiments, which comprises the following steps:

providing the base plate on which the flexible substrate to be stripped is formed;

arranging the base plate on which the flexible substrate to be stripped is formed on the platform;

pressing a pressing plate onto the flexible substrate to be stripped;

heating the base plate on which the flexible substrate to be stripped is formed with laser emitted from the laser generator, so that the flexible substrate to be stripped is decomposed on the side contacting the base plate; and stripping the flexible substrate to be stripped from the base plate.

For example, the step of providing the base plate on which the flexible substrate to be stripped is formed comprises: cutting the flexible substrate to be stripped with laser to form an exhaust passage.

For example, the step of arranging the base plate on which the flexible substrate to be stripped is formed on the platform comprises: arranging the suction mouth the pressing plate in such a manner to correspond to the exhaust passage on the flexible substrate to be stripped in position.

For example, prior to the step of arranging the base plate on which the flexible substrate to be stripped is formed on the platform, the method further comprises forming a display device on the flexible substrate to be stripped.

DETAILED DESCRIPTION OF EMBODIMENTS

The specific embodiments of the present disclosure shall be further described in the following text with reference to the figures and the embodiments. The following embodiments are only used for explaining more clearly the technical solution of the present disclosure rather than limiting the protection scope of the present disclosure.

Figure 1:
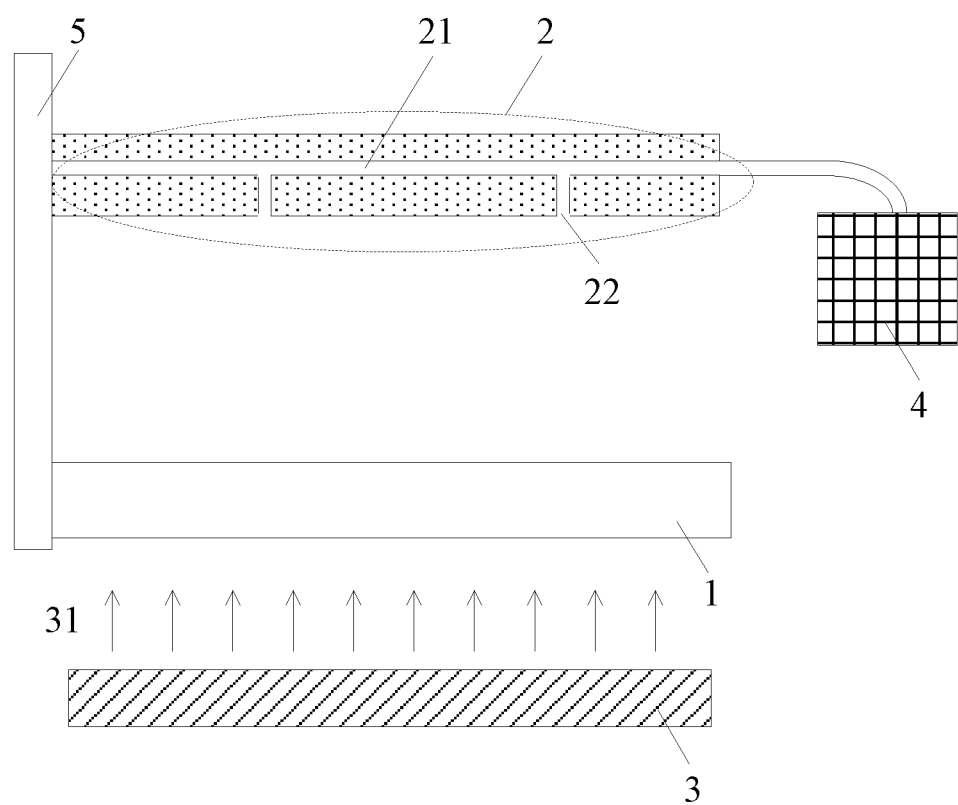
FIG. 1 is a structural view for illustrating a device for stripping a flexible substrate in an embodiment of the present disclosure.

As shown in FIG. 1, in an embodiment of the present disclosure, a device for stripping a flexible substrate comprises a platform 1, a pressing plate 2 which is arranged above the platform 1, and a laser generator 3 which is arranged below the platform 1. The pressing plate 2 is provided with a negative pressure passage 21. The pressing plate 2 is provided with a suction mouth 22 which is arranged in a side of the pressing plate facing the platform and which communicates with the negative pressure passage 21. It is noted that the terms for describing orientation, such as "above", "below", are only used to describing relative spatial position between components. For example, in other exemplary embodiments, the pressing plate 2 is arranged below the platform 1, and the laser generator 3 is arranged above the platform. It is further noted that the pressing plate 2 and the laser generator 3 can be arranged on a same side of the platform 1, provided that irradiation of laser from the laser generator 3 is not affected.

The platform 1 is configured to carry a base plate on which a flexible substrate to be stripped is formed (not shown). The flexible substrate to be stripped is provided with an exhaust passage in advance, to effectively discharge the gas generated during stripping. For example, the exhaust passage is formed in the flexible substrate to be stripped by laser cutting. To improve the effect of discharging gas and preventing corrugation in the flexible substrate, the exhaust passage corresponds to the suction mouth 22 in position.

The laser generator 3 is configured to emit laser 31. The laser 31 heats the base plate on which the flexible substrate to be stripped is formed, so that the flexible substrate to be stripped is decomposed on a side contacting the base plate and is stripped.

The pressing plate 2 is configured to be pressed onto the flexible substrate to be stripped, so that the flexible substrate to be stripped becomes flat. Besides, the pressing plate 2 is arranged in such a manner that the negative pressure passage 21 extracts through the suction mouth 22 the gas which is generated during decomposition of the flexible substrate to be stripped on the side contacting the base plate.

In the present embodiment, the pressing plate 2 is provided with the negative pressure passage 21 and the suction mouth 22, and thus is capable of extracting the gas which is generated when the flexible substrate to be stripped is heated and decomposed. This avoids the flexible substrate to be stripped from locally expanding, and corrugation will not occur in the flexible substrate to be stripped upon cooling, thus decreasing defective products.

Figure 3:
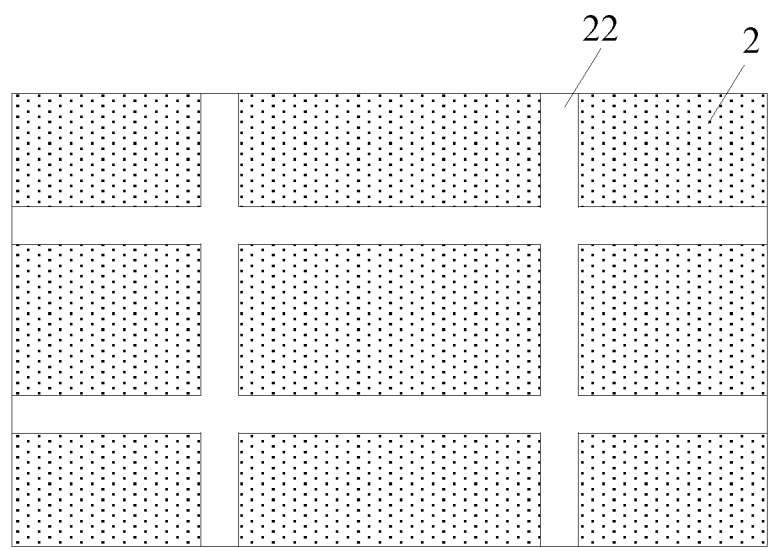
FIG. 3 is a schematic view for illustrating a surface of a first type pressing plate facing a platform in an embodiment of the present disclosure.
Figure 4:
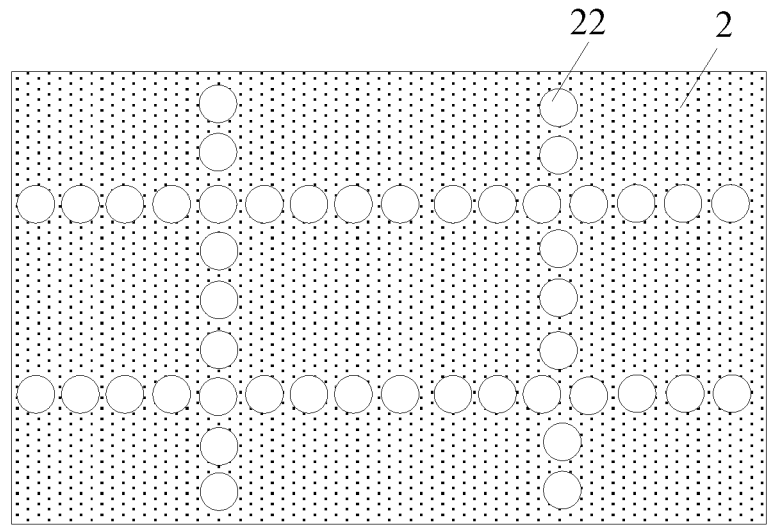
FIG. 4 is a schematic view for illustrating a surface of a second type pressing plate facing a platform in an embodiment of the present disclosure.

For example, the stripping device further comprises a negative pressure generator 4. The negative pressure generator 4 is configured to provide negative pressure for the negative pressure passage 21 of the pressing plate 2. As for the pressing plate 2, the negative pressure passage 21 is arranged inside the pressing plate 2. The negative pressure generator 4 communicates with the negative pressure passage 21 via a pipe, thus providing negative pressure for the negative pressure passage 21. The negative pressure provided by negative pressure generator 4 forms an environment close to vacuum in the negative pressure passage 21, so that the gas which is generated when the flexible substrate to be stripped is heated and decomposed can be extracted through the suction mouth 22. For example, the suction mouth 22 has a shape of groove, as shown in FIG. 3. For example, the suction mouth 22 consists of a plurality of holes which communicate with the negative pressure passage 21, as shown in FIG. 4. For example, the suction mouth 22 can be distributed continuously, discretely, or combination thereof.

Figure 5:
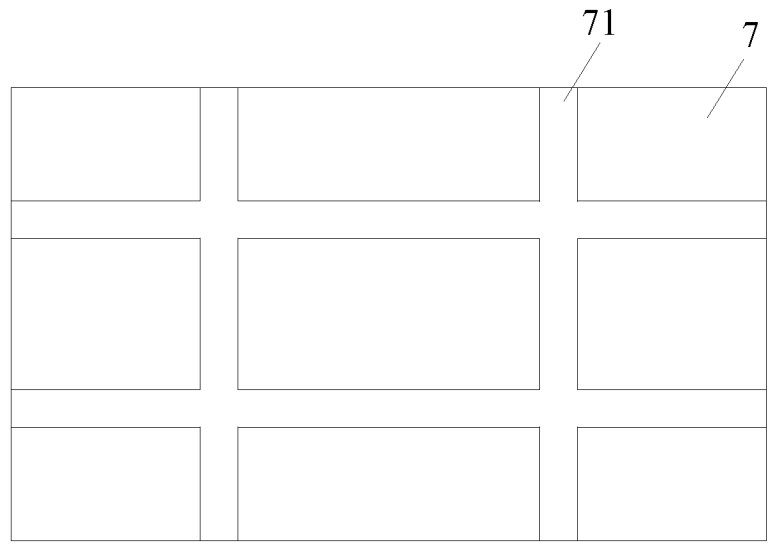
FIG. 5 is a schematic view for illustrating a flexible substrate which has been stripped in an embodiment of the present disclosure.

Reference is made to FIG. 5 in which the exhaust passage 71 of the flexible substrate to be stripped 7 is shown. The exhaust passage 71 is formed by e.g., laser cutting. The exhaust passage 71 can discharge the gas which is generated when the flexible substrate to be stripped 7 is heated and decomposed. It is noted that, in order to extract more effectively the gas which is generated when the flexible substrate to be stripped 7 is heated and decomposed, a pattern of the suction mouth 22 of the pressing plate 2 corresponds to that of the exhaust passage 71 of the flexible substrate to be stripped 7 which is formed by laser cutting.

Figure 2:
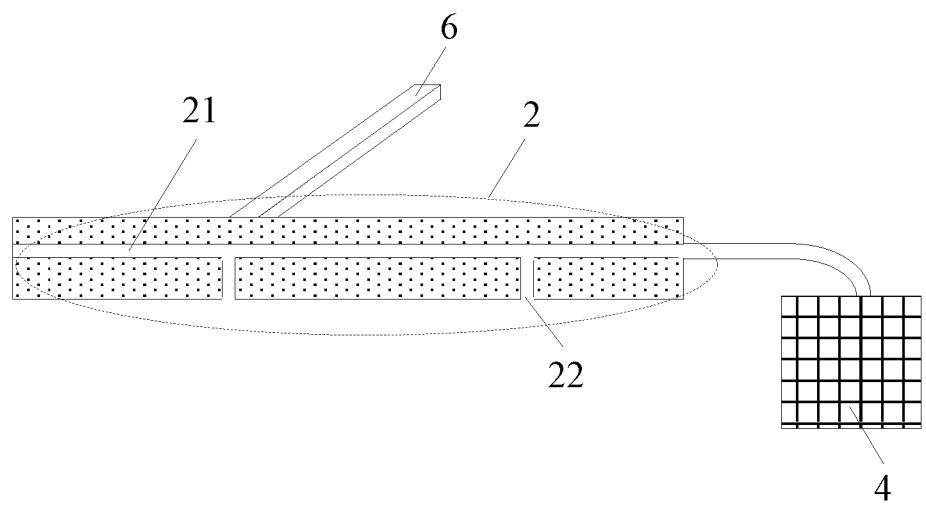
FIG. 2 is a structural view for illustrating another device for stripping a flexible substrate in an embodiment of the present disclosure.

In the present embodiment, the pressing plate 2 can be moved in various manners. For example, as shown in FIG. 1, the stripping device further comprises a supporting part 5. The supporting part 5 can be provided with a vertical guide rail and a horizontal guide rail. The pressing plate 2 is arranged on the supporting part 5, and move vertically along the vertical guide rail or horizontally along the horizontal guide rail. For example, the stripping device shown in FIG. 2 differs from that of FIG. 1 in that, the stripping device further comprises a connecting arm 6, which is connected with the pressing plate 2 for driving the pressing plate 2 to move vertically or horizontally. In an embodiment of the present disclosure, the connecting arm 6 is a robotic manipulator. Of course, the connecting arm 6 can be realized in other ways, which are not described herein for simplicity.

For example, the laser generator 3 emits laser with a wavelength less than 355 nm. For example, the laser generator 3 is a XeCl laser generator emitting laser with a wavelength of 308 nm, or a yttrium aluminum garnet laser emitting laser with a wavelength of 355 nm.

Embodiments of the present disclosure have the following beneficial effects. The pressing plate is provided with the negative pressure passage and the suction mouth, which can extract the gas generated when the flexible substrate to be stripped is heated and decomposed. This avoids the flexible substrate to be stripped from locally expanding, and corrugation will not occur in the flexible substrate to be stripped upon cooling, thus decreasing defective products.

Figure 6:
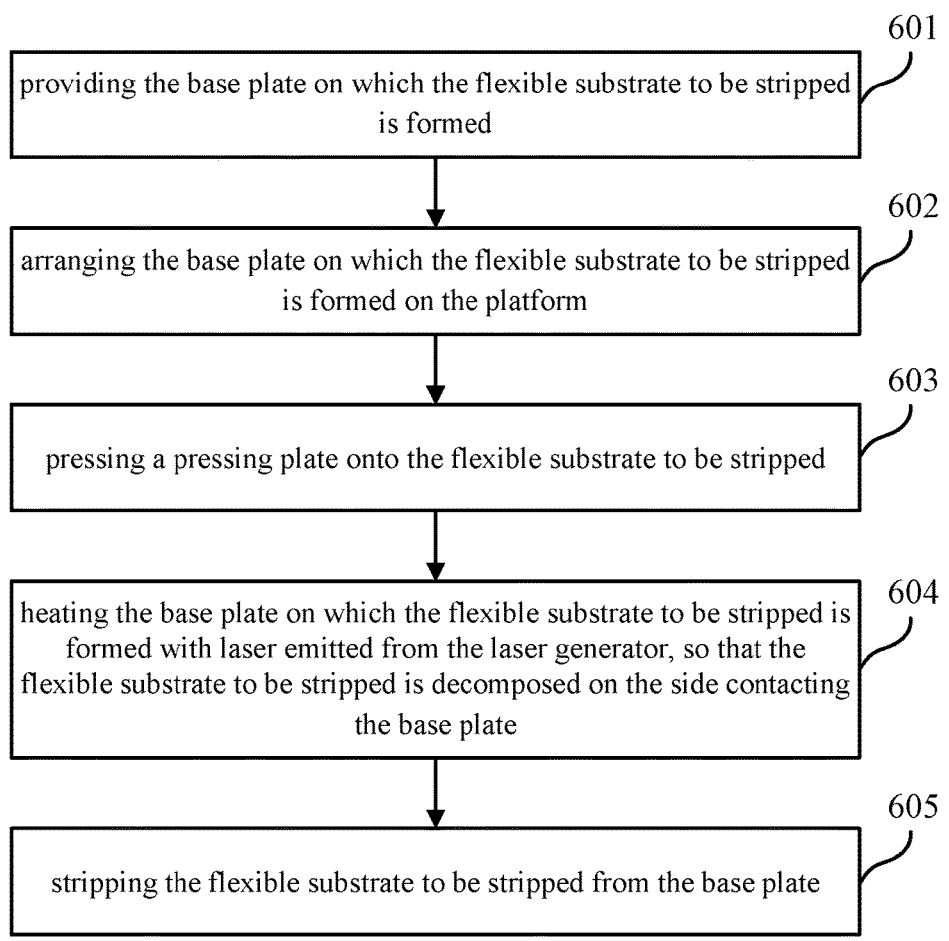
FIG. 6 is a flow chart for illustrating a method for stripping a flexible substrate in an embodiment of the present disclosure.

As shown in FIG. 6, an embodiment of the present disclosure further provides a method for stripping a flexible substrate, comprising:

601, providing the base plate on which the flexible substrate to be stripped is formed;

602, arranging the base plate on which the flexible substrate to be stripped is formed on the platform;

603, pressing a pressing plate onto the flexible substrate to be stripped;

604, heating the base plate on which the flexible substrate to be stripped is formed with laser emitted from the laser generator, so that the flexible substrate to be stripped is decomposed on the side contacting the base plate; and 605, stripping the flexible substrate to be stripped from the base plate.

For example, the step of providing the base plate on which the flexible substrate to be stripped is formed comprises: cutting the flexible substrate to be stripped with laser to form an exhaust passage.

For example, the step of arranging the base plate on which the flexible substrate to be stripped is formed on the platform comprises: arranging the suction mouth the pressing plate in such a manner to correspond to the exhaust passage on the flexible substrate to be stripped in position.

For example, prior to the step of arranging the base plate on which the flexible substrate to be stripped is formed on the platform, the method further comprises forming a display device on the flexible substrate to be stripped.

Embodiments of the present disclosure have the following beneficial effects. The pressing plate is provided with the negative pressure passage and the suction mouth, which can extract the gas generated when the flexible substrate to be stripped is heated and decomposed. This avoids the flexible substrate to be stripped from locally expanding, and corrugation will not occur in the flexible substrate to be stripped upon cooling, thus decreasing defective products.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A device for stripping a flexible substrate, comprising:
a platform configured to carry a base plate on which a flexible substrate to be stripped is formed;
a pressing plate configured to be pressed onto the flexible substrate to be stripped; and
a laser generator configured to emit laser for heating the base plate, so that the flexible substrate to be stripped is decomposed on a side contacting the base plate and thus stripped;
wherein the pressing plate is provided with a negative pressure passage, the pressing plate is provided with a suction mouth which is arranged in a side of the pressing plate facing the platform and which communicates with the negative pressure passage, and the negative pressure passage extracts through the suction mouth a gas which is generated during decomposition of the flexible substrate to be stripped on a side contacting the base plate.

2. The stripping device of claim 1, wherein the flexible substrate to be stripped comprises an exhaust passage.

3. The stripping device of claim 2, wherein the exhaust passage of the flexible substrate to be stripped corresponds to the suction mouth of the pressing plate in position.

4. The stripping device of claim 1, wherein
the pressing plate is arranged above the platform, the laser generator is arranged below the platform, and the laser emitted by the laser generator passes through the platform to irradiate the base plate.

5. The stripping device of claim 1, further comprising a negative pressure generator configured to provide negative pressure for the negative pressure passage of the pressing plate.

6. The stripping device of claim 1, further comprising a supporting part which is provided with a vertical guide rail and a horizontal guide rail;
the pressing plate is arranged on the supporting part, and is moved vertically along the vertical guide rail or horizontally along the horizontal guide rail.

7. The stripping device of claim 1, further comprising a connecting arm, which is connected with the pressing plate and drives the pressing plate to move vertically or horizontally.

8. The stripping device of claim 7, wherein the connecting arm is a robotic manipulator.

9. The stripping device of claim 1, wherein the laser emitted by the laser generator has a wavelength less than 355 nm.

10. The stripping device of claim 9, wherein the laser generator is a XeCl laser generator with a laser wavelength of 308 nm, or a yttrium aluminum garnet laser with a laser wavelength of 355 nm.

11. The stripping device of claim 1, wherein the suction mouth has a shape of groove.

12. The stripping device of claim 1, wherein the suction mouth comprises a plurality of holes communicating with the negative pressure passage.

13. The stripping device of claim 2, further comprising a negative pressure generator configured to provide negative pressure for the negative pressure passage of the pressing plate.

14. The stripping device of claim 3, further comprising a negative pressure generator configured to provide negative pressure for the negative pressure passage of the pressing plate.

15. The stripping device of claim 4, further comprising a negative pressure generator configured to provide negative pressure for the negative pressure passage of the pressing plate.

16. The stripping device of claim 2, further comprising a supporting part which is provided with a vertical guide rail and a horizontal guide rail;
the pressing plate is arranged on the supporting part, and is moved vertically along the vertical guide rail or horizontally along the horizontal guide rail.

17. A method for stripping a flexible substrate with the stripping device of claim 1, comprising steps of:
providing the base plate on which the flexible substrate to be stripped is formed;

arranging the base plate on which the flexible substrate to be stripped is formed on the platform;

pressing a pressing plate onto the flexible substrate to be stripped;

heating the base plate on which the flexible substrate to be stripped is formed with laser emitted from the laser generator, so that the flexible substrate to be stripped is decomposed on the side contacting the base plate; and stripping the flexible substrate to be stripped from the base plate.

18. The stripping method of claim 17, wherein the step of providing the base plate on which the flexible substrate to be stripped is formed comprises: cutting the flexible substrate to be stripped with laser to form an exhaust passage.

19. The stripping method of claim 18, wherein the step of arranging the base plate on which the flexible substrate to be stripped is formed on the platform comprises: arranging the suction mouth the pressing plate in such a manner to correspond to the exhaust passage on the flexible substrate to be stripped in position.

20. The stripping method of claim 17, wherein prior to the step of arranging the base plate on which the flexible substrate to be stripped is formed on the platform, the method further comprises forming a display device on the flexible substrate to be stripped.

* * * * *